United States Patent
Mossey (10) Patent No.: US 9,942,872 B1
(45) Date of Patent: Apr. 10, 2018

(54) METHOD AND APPARATUS FOR WIRELESS DEVICE LOCATION DETERMINATION USING SIGNAL STRENGTH

(71) Applicant: Rapid Focus Security, LLC, Burlington, VT (US)

(72) Inventor: Timothy Mossey, Burlington, VT (US)

(73) Assignee: Rapid Focus Security, LLC, Burlington, VT (US)

( * ) Notice: Subject to any disclaimer, the term of this patent is extended or adjusted under 35 U.S.C. 154(b) by 0 days.

(21) Appl. No.: 15/618,716

(22) Filed: Jun. 9, 2017

(51) Int. Cl.
*H04W 74/00* (2009.01)
*H04W 64/00* (2009.01)
*G01S 5/02* (2010.01)

(52) U.S. Cl.
CPC ......... *H04W 64/003* (2013.01); *G01S 5/0252* (2013.01)

(58) Field of Classification Search
CPC ..... H04W 12/08; H04W 36/08; H04W 36/32; H04W 36/36; H04W 48/16; H04W 48/18; H04W 48/20; H04W 4/025; H04W 72/085; H04W 88/06; H04W 12/06; H04W 36/14; H04W 36/24; H04W 64/00; H04W 64/003
USPC .......................................... 455/456.1–456.6
See application file for complete search history.

(56) References Cited

U.S. PATENT DOCUMENTS

| 9,544,323 | B2 | 1/2017 | Porcello et al. | |
| 2004/0263388 | A1* | 12/2004 | Krumm | G01C 21/206 342/451 |
| 2007/0192862 | A1* | 8/2007 | Vermeulen | H04L 63/0236 726/23 |
| 2013/0196685 | A1* | 8/2013 | Griff | H04L 43/067 455/456.1 |
| 2016/0226968 | A1* | 8/2016 | Hsieh | G06F 17/30563 |
| 2017/0086084 | A1* | 3/2017 | Jarvis | H04W 24/06 |
| 2017/0302691 | A1* | 10/2017 | Singh | H04L 63/1425 |

OTHER PUBLICATIONS

Beresford, Alastair R., Location Privacy in Ubiquitous Computing, University of Cambridge, 139 pages, No. 612. 2005.

(Continued)

*Primary Examiner* — Nathan Taylor
(74) *Attorney, Agent, or Firm* — Kurt Rauschenbach; Rauschenbach Patent Law Group, LLP (57) ABSTRACT

A method of wireless device location determination includes defining a region of interest comprising a plurality of sensors. A reference frame and a grid comprises a plurality of simulation points with locations based on a coordinate system associated with the region of interest. Location coordinates for the plurality of sensors are established. A plurality of simulated wireless signal strengths is determined for each simulation point. A plurality of simulated signal strength matrix is generated using the plurality of simulated wireless signal strengths. A composite matrix is generated based on the plurality of simulated signal strength matrices. Wireless signal strength is measured at each of the plurality of sensors based. A measured wireless signal strength vector is then generated based on the measured wireless signal strength. A location of the intrusive device is then determined based on the measured wireless signal strength vector and the composite matrix.

23 Claims, 6 Drawing Sheets

(56) References Cited

OTHER PUBLICATIONS

Bao, Jie, et al., Location-based and Preference-Aware Recommendation Using Sparse Geo-Social Networking Data, ACM SIGSPATIAL GIS, '12, Nov. 6-9, 2012, 10 pages, Redondo Beach, California.
https://developer.apple.com/library/content/documentation/Use . . . , 4 pages, 2016; Retrieved Jul. 25, 2017.
U.S. Appl. No. 15/265,368, filed Sep. 14, 2016, USPTO, US.
U.S. Appl. No. 15/285,733, filed Oct. 5, 2016, USPTO, US.
U.S. Appl. No. 15/617,103, filed Jun. 8, 2017, USPTO, US.

* cited by examiner

METHOD AND APPARATUS FOR WIRELESS DEVICE LOCATION DETERMINATION USING SIGNAL STRENGTH

The section headings used herein are for organizational purposes only and should not be construed as limiting the subject matter described in the present application in any way.

INTRODUCTION

The growing number of wireless and wired network devices worldwide has generated a need for methods and apparatus that provide precise location and movement information about these devices quickly and efficiently. For example, indoor location-aware services play an increasingly central role in our individual and collective experiences, spanning beyond purely technological usage to a wide spectrum of what has now become essential modalities of interaction between heterogeneous entities: individuals, collectives, communities, the world at large. Some key examples are social networking, augmented reality, law enforcement, health care, automated transportations, marketing, entertainment, asset tracking, compliance regulation, and other applications. With the advent of a Fourth Industrial Revolution, and a world predicted to be networked by nearly 30 billion connected devices by 2025, fast and accurate location identification of these devices—from smartphones to wearables to health monitors—is a vital prerequisite for optimal quality in the above-mentioned services.

Location services are crucial to systems that need to derive insight from data that relates to location and movement. This includes location identification not only in terms of the current geographical coordinates but also in terms of velocity vectors. That is, both speed and direction of any movement of the device. Movement includes both absolute and relative motion of devices.

A well-monitored environment or ecosystem of wireless devices will support fast and accurate identification of intruding devices and also the subsequent isolation of those devices. Location schemes must act quickly enough to be able to nullify a threat in a timely manner. Location schemes must also be able to track the movement of intruding devices accurately and consistently.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

New technology is needed for improving the automation, efficiency, speed, and precision of device location and motion determination. Automated determination of device location and motion information quickly and precisely can allow threats to be identified so response to those threats can then be initiated quickly. In addition, automated determination of device location and motion information quickly and precisely can simplify and increase the efficiency of network operations and task management of a collection of wireless devices. Automated determination of device location and motion information quickly and precisely can improve the number, variety and quality of services that rely on that information.

Prior art systems that provide location information, e.g. global positioning system (GPS)-based devices or WiFi positioning systems, generally calculate device coordinates at the device, store these coordinates as data in memory and push the data at specific intervals to a central computer. These devices operate individually, and do not share location information. Similarly, the systems do not use shared information to help generate a moving map of one or more devices across a region.

Prior art GPS, or other similar satellite based systems, and Wi-Fi positioning systems have been adequate for large-scale patterned usage analysis perspective. However, emerging services, such as augmented reality, health monitoring and others are demanding higher precision, indoor location coordinates and movement awareness that are not provided by prior art GPS and Wi-Fi positioning systems. These prior art location mechanisms for mobile devices do not provide high enough precision of location coordinates for many modern applications. In addition, these prior art location mechanisms do not formally accommodate and accurately track the change in the coordinates with time.

Satellite-based location systems are aimed at outdoor applications. WiFi is more accurate than satellite, especially for indoor locations, because of the multipath issue—radio signals bouncing off the surroundings—and signal loss suffered by GPS signals. Both WiFi and satellite-based prior art approaches suffer from the same problems of approximation, inaccuracy, time-delay, static data, and exclusion of movement from the calculation and the results. While adequate for many large-scale patterned-usage analysis applications, GPS and Wi-Fi positioning systems are not capable of rapid, pinpointed identification and isolation of intruding wireless devices in a monitored environment, especially if an intrusive device is moving. In particular, prior art location schemes require inputs from many devices, and these inputs are averaged over time. As such, they fail to quickly detect intruders and hence fail to nullify any threat vectors that might emerge from those devices in timely manner. Additionally, these prior art location schemes fail to accurately track the movement of an intruding device as it propagates through an environment.

Prior art Wi-Fi positioning systems generally use some combination of received signal strength indication, device fingerprinting, angle-of-arrival and/or time-of-flight data to determine location. All of these mechanisms use some form of measurement of signal strength and/or angle of arrival on the Wi-Fi access points, in combination with the Wi-Fi hotspot database. One data seeding mechanism correlates mobile device GPS coordinates with known Wi-Fi access point MAC addresses to populate a database. Thus, known Wi-Fi approaches suffer from the same accuracy and speed problems that are associated with approximation, static data and lack of representation of movement and direction.

Fast and accurate positional identification of wireless devices including smartphones, wearables, and tracking devices is of fundamental importance for providing advanced location services. One high-priority application is to identify and isolate the threat vector of an unknown/intruding device within a monitored and secure ecosystem of wireless devices connected in a network. In general, the demand for accurate location-based services and the need for detecting and tracking intruding devices extends beyond purely technological usage. A wide spectrum of interactions between heterogeneous entities relies on accurate location services. These heterogeneous entities include individuals, collectives, communities, and the world at large. Some key examples of desired applications for this technology are social networking, augmented reality, law enforcement, health care, automated transportation, and many others similar applications.

In scenarios that involve the location of wireless devices, the respective signal strength of the wireless signal emanating from the devices may be the only reliable measurable entity to model the distribution of their positions and also to subsequently identify the precise location of a newly-discovered transmitter device. However, prior art location schemes do not allow a model of the device position distribution to be created based purely on signal strength of the wireless transmissions from the devices. In many applications, only partial or intermittent information is available from wireless signals, and as such, statistical methods are used. For this and other reasons, determining location of a device can require a dense dataset of received wireless signal strengths from a distributed set of devices in a region of interest. That is, data from a large number of devices distributed in a small space with their signal strengths captured within a very short span of time is required. Collecting such dense datasets is expensive both in terms of positioning real transmitting and receiving devices to capture the signal strength data as well as the time needed to collect the data. The time-factor is particularly problematic because it results in the use of additional resources. The time-factor is also problematic because of a potential change in positioning of the devices while the data is being collected. The change in positioning of the devices can cause the computation to be time-frozen and thus unreliable. In other words, the accurate identification, and hence effective isolation, of the position and the motion of an intrusive device becomes more problematic if it is on the move in prior art systems that cannot operate quickly.

One feature of the present teaching is the ability to rapidly detect an intrusive device and its motion so that steps may be taken to remediate any threats that may be posed by the intrusive device. Another feature of the present teaching is the ability to detect an intrusive device's location and/or its motion precisely, allowing targeted remediation. These features can be realized with the methods and apparatus of embodiments of the present teaching which rely on a combination of electromagnetic wave propagation analysis together with learning algorithms, including supervised and unsupervised learning algorithms to determine device location with a high degree of accuracy, and also to determine device motion.

Prior art statistical estimation methods that use k-nearest neighbor require dense datasets to find a reasonable solution of the location of a radio transmitter based on its signal strength. These dense datasets are typically costly and time consuming to collect. In contrast, the method of the present teaching uses a wave propagation analysis to generate sparse matrices that are fed into learning algorithms that are able to estimate location. Using sparse matrices reduces computational complexity and reduces processing time as compared to other known location determination methods. Sparse matrices are matrices for which most of the elements are zero.

A "region of interest" is defined herein to be a bounded region of space in which various networked wireless devices are located. In some embodiments, the region of interest is a region that uses methods of the present teaching to monitor for unknown or unwelcome devices. The region may be a small region, e.g. a room or a building, or it may be a larger region such as a campus, metropolitan area or other geographical area. The region of interest may also be a moving platform, for example, the region of interest may be a palate or a cargo bay on a transportation vehicle. All the devices being monitored are expected to stay within the bounded space of the region of interest. The bounded space comprehensively defines the spatial scope of detecting the precise location of any device. The region of interest may comprise a one-, two- or three-dimensional space.

For purposes of this disclosure, a "sensor" is defined to be a wireless device that is capable of determining the signal strength of a wireless signal that is detected by the device.

An "intrusive device" is defined to be a device that transmits a wireless signal and represents an unknown device or a device that is not known and/or allowed to be located in the region of interest. As understood by those familiar with the art, a sensor device and an intrusive device are tied to the role of the device, rather than the specific hardware implementation. That is, a device may act as a sensor device, i.e. a sensor role. The same device may also act in an intrusion role. Furthermore, roles may change over time.

The term "intrusive device" may be described in this disclosure as a device that is an object of a security scan and/or may be engaging in threats of some kind. However, as understood by those familiar with the art, the "intrusive device" refers to a device that is located by the sensor devices, and may not, in fact have any basis in security or any associated threat. For example, the "intrusive device" may be a wireless gaming device that is located during the course of an entertainment application. As another example, the "intrusive device" may be an asset tagged by a wireless identification device that enters a region of interest.

In general, a wireless device of the present teaching may take the form of any known device that transmits a wireless signal, for example, a wireless device may take the form of a tablet, laptop, cell phone, smart phone. The wireless device may be another specialized computing device, such as a gaming device, security device, or tracking device. In some embodiments, the sensor devices are devices produced by Pwnie Express, Boston, Mass., the assignee of the present application. These devices include PWN PHONE™, PWN PRO, PWN PAD™ and/or PWN PLUG.

One feature of the wireless device location determination service of the present teaching is that it may incorporate device-to-device peer awareness across a set of networked sensors to build a time-varying tensor field of key sensor and other device positions and velocities in a region of interest. See, for example, U.S. patent application Ser. No. 15/265,368 entitled "Reflective Network Device Position Identification", U.S. patent application Ser. No. 15/285,733 entitled "Self-Managed Intelligent Network Devices that Protect and Monitor a Distributed", and U.S. patent application Ser. No. 15/617,103 entitled "Direction-Aware Device Location Services", which are all assigned to the assignee of the present application and which are incorporated herein by reference.

For example, U.S. patent application Ser. No. 15/265,368 discloses methods and apparatus for networked devices to share information for purposes of managing, identifying and locating the devices using various methods. Using these and other known methods to share information amongst networked peer devices allows systems of the present teaching to achieve precise device location information more quickly and efficiently than prior art Wi-Fi positioning schemes.

Some embodiments of the wireless device location determination service of the present teaching utilize an embedded software module in the sensor devices. The software module generates the static location coordinates, as well as velocity vector and acceleration vector of other wireless devices in a region of interest. The device location and movement information generated by the embedded software module may be stored and utilized by other software within the device, and/or the information may be sent to a remote server or database that may act as a network management system and/or the information may be provided to a cloud-based service or application that uses the information to perform other tasks. The terms "cloud", and "cloud networking" as used herein includes services and networks that run over the public internet and work over any physical communications infrastructure, including wired or wireless infrastructures that may be privately or publicly owned, used and operated. The term "cloud" as used herein also includes so-called "private clouds" networking and services that run similarly over a private or proprietary infrastructure.

Figure 1:
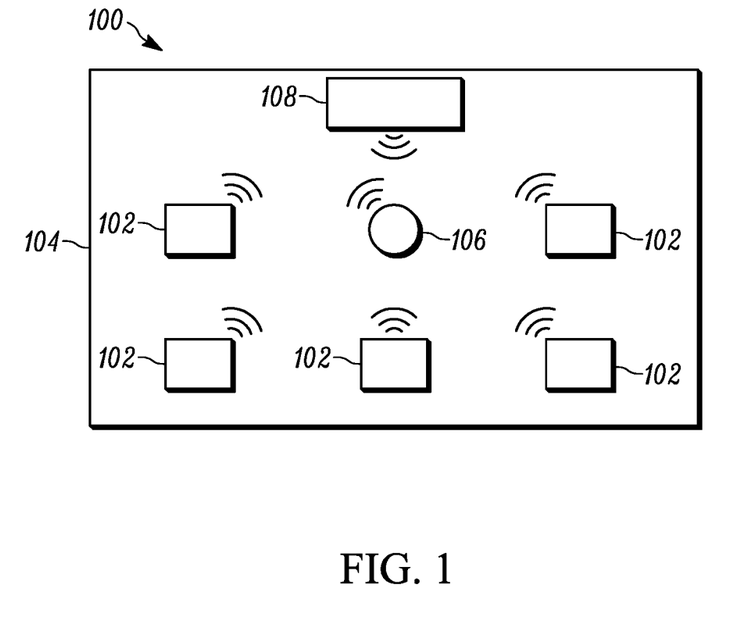
FIG. 1 illustrates a wireless network instantiation of an embodiment of an apparatus and method for providing wireless device location determination services according to the present teaching.

FIG. 1 illustrates an embodiment of a network of sensors comprising a wireless device location determination system 100 of the present teaching. A plurality of sensors 102 is deployed across a region of interest 104. The sensors 102 discover each other via known methods. One or more intrusive device 106 may also be in the region of interest 104, the intrusive device 106 emits wireless radiation. The sensors 102 and/or the intrusive device 106 may take the form of tablets, laptops, cell phones, smart phones and other specialized computing devices, such as gaming devices. The sensors 102 and/or the intrusive device 106 may also take the form of video servers and security appliances. The sensors 102 and/or the intrusive device 106 may include any of a variety of networked devices including network nodes, such as switches and routers, wireless routers, computer processors, and storage devices. The sensors 102 and/or the intrusive device 106 may be client devices or server devices known in the art.

In some embodiments, an optional server 108 may also be deployed. The server 108 may be a central server or a load-balanced hosted solution. The server 108 hardware may comprise any of a variety of known processors, including a computer or CPU, integrated circuit, laptop, tablet or smartphone. The hardware may be a stand-alone device or multiple stand-alone devices. In some embodiments, the server 108 is a cloud-based processor. The cloud may be a public cloud, a private cloud or a hybrid. In some embodiments, the server 108 is a wireless router or a wireless hotspot device. In some embodiments, the server 108 is one or more of the sensors 102.

The sensors 102 connect to each other using wireless communication connections. In various embodiments, the sensors 102 employ known wireless network communication capability, such as WiFi, cellular or LTE capability. The server 108 also has wireless communication capability, and the sensors 102 connect to the server 108 using wireless communication connections. In some embodiments, wired connections are also used to make connections to the server 108.

Figure 2:
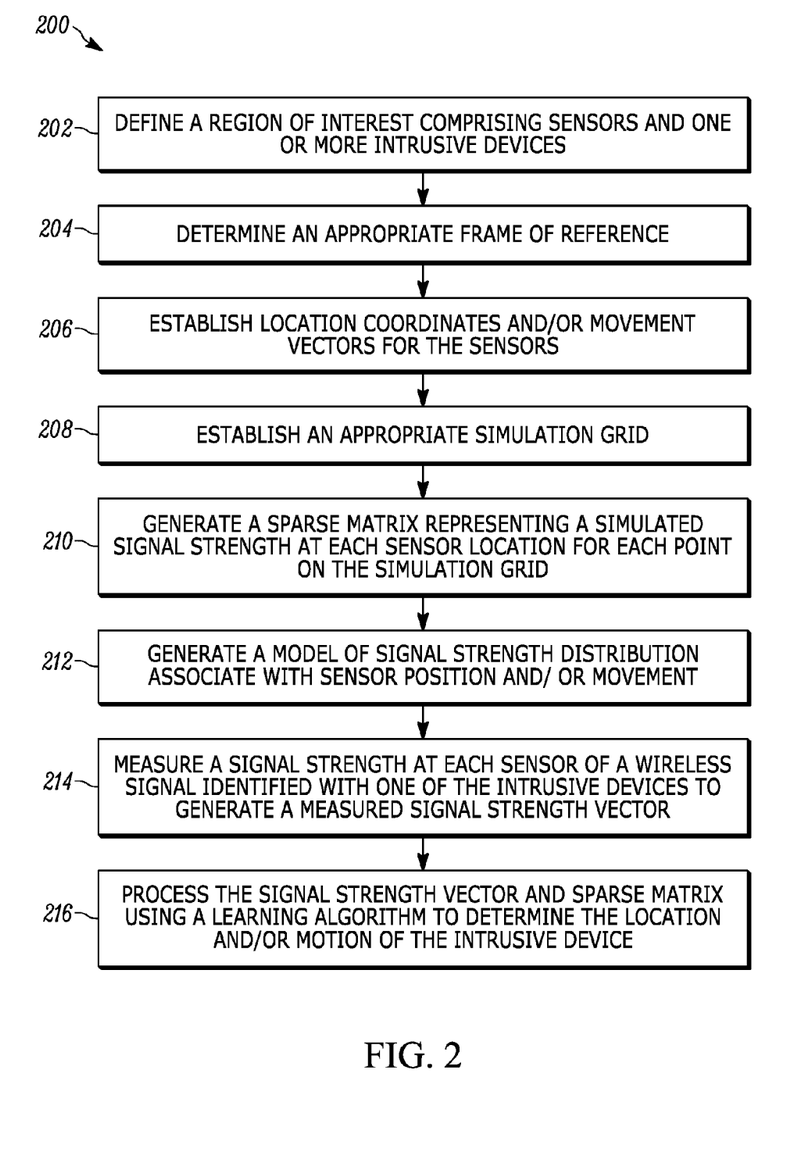
FIG. 2 illustrates a process flow diagram of an embodiment of an apparatus and method for providing wireless device location determination services of the present teaching.

FIG. 2 illustrates a process flow diagram 200 of an embodiment of a method for wireless device location determination system of the present teaching. Referring to both FIGS. 1 and 2, a first step of the method 202 defines a region of interest 104 that includes sensor devices 102. During a set-up phase, there may or may not be one or more intrusive device 106 in the region of interest 104. The region of interest 104 may be, for example, a room, a storage space, a moving platform, a building, a campus, part or all of a city, region, state, country, or some other larger space. In step two 204 of the method, the well-defined spatial topology of the region of interest 104 is annotated using a Cartesian coordinate system with respect to a chosen inertial frame of reference, F. In some embodiments, the frame of reference, F, is chosen to represent the coordinates of the sensors 102 and other wireless transmission devices in the region of interest in the most distributed manner. That is, the choice of F is based on minimizing the initial localized clustering of the known data set that represents coordinates of the sensors and devices in the environment. While the present teaching is described primarily in the context of a three-dimensional region of interest, extensions to one- or two-dimensional region of interest are straightforward for those familiar with the state of the art.

The reference frame of the present teaching can be non-static, but should be non-accelerating, or inertial. Application of a Helmholtz equation, which is described further below, requires use of an inertial reference frame. By using moving inertial reference frames, the system of the present teaching may be applied to an environment that is moving at a constant speed and also may be applied to a static environment.

In step three 206 of the method, a number, N, of sensors 102 are then positioned throughout the region of interest and their Cartesian coordinates in F are recorded. The Cartesian coordinates of each sensor are represented by a three element vector $C_i$, i=1 . . . N. The vector is represented as $C_i=\{x, y, z\}$ representing a three-dimensional Cartesian vector. In some embodiments, the Cartesian coordinates of each sensor 102 are established using known location schemes, such as GPS, Wifi or other schemes. In some embodiments, the method requires some initial measured data points based on measuring a wireless signal strength from known and/or trusted wireless sources at the sensors 102. A small number of measurements is needed. More initial measured data points will provide a more accurate estimator. However, in some embodiments, the estimator is improved over time based on iteration, and so a small number can be used in a set up phased. In some embodiments, the region of interest includes a number of known and/or trusted wireless transmitters with known locations. These wireless transmitters may be cell towers, WiFi hot spots, or WiFi routers. In some embodiments, the wireless sensors 102 can be wireless transmitters for other sensors.

Step four 208 of the method establishes a set of simulation points, $S_p$. The simulation grid points are chosen to simulate virtual wireless transmitters positioned at the simulation grid points. In some embodiments, the process that generates the simulation points resides in the server 108. In some embodiments, the process that generates the simulation points resides in one or more sensors 102. The simulation points are created and distributed equidistantly on a grid and that grid is then affixed to the bounded space that represents the region of interest 104. As a result, the simulation points are similarly annotated by the Cartesian coordinate values of the chosen inertial frame of reference, F. The choice of the grid is made based on the desired resolution of the location scheme and/or the complexity and processing time of computing various related steps in the method. More grid points in a given volume of space can produce higher resolution, but may result in longer compute times.

Step five 210 of the method generates a sparse matrix representing a simulated signal strength at each sensor for each point on the simulation grid. In some embodiments, the process that generates the sparse matrices is running in the server 108. It is possible to position a real device that transmits a wireless signal at each simulation point and then to measure and record the signal of each real device as detected by the sensors. However, positioning actual devices across all points in set, $S_p$, and gathering data is resource intensive and exceedingly time consuming. As such, a key aspect of the present teaching is that methods do not require such actual positioning of devices. Instead, in step five 210, a signal simulator process is used in which a simulated wireless transmitter is positioned on each point in $S_p$. The set of these simulated devices is $S_d$. $S_d$ is isomorphic to $S_p$. As such, size of $S_p$ is equal to size of $S_d$, which is size, S. Thus, the Cartesian coordinates of each simulated wireless transmitter is the same as the corresponding simulation point, $S_i$, i=1 . . . S, where each $S_i=\{x,y,z\}$, a three-dimensional Cartesian vector.

Signal propagation from each simulated wireless transmitter in $S_d$ is then computed across the geometry of the environment in terms of the signal strengths detected by each sensor 102 positioned in $C_i$, i=1 . . . N in F. It is worth noting the sensor locations may not be the same as the grid points. That is, the $C_i$ may or may not be equivalent to the $S_i$.

To model the propagation of wireless signals from these simulated devices, the Helmholtz equation is used as the form of time-independent electromagnetic wave equation. In some embodiments, to approximate the loss of the signal strength as it moves through open air, the free-space path loss formula (FSPL) is applied. In some embodiments, to approximate the loss of the signal strength as it moves inside a building, especially with dense population of objections, the Log-distance path loss model is used. In some embodiments a combination of these loss models is utilized. For example, detailed knowledge of the distribution of objects in the bounded space in question can be leveraged to optimally combine FSPL and Log-distance path loss models, if necessary.

After applying FSPL and/or Log-distance path loss formula on Helmholtz-formulation electromagnetic wave equations for simulated wireless signals from each position Si as detected by each sensor in $C_i$ (i=1 . . . N), for each $S_j$ (j=1 . . . S) a sparse Matrix $M_j$ is generated where $(M_j)$i indicates the simulated signal strength at the sensor location i for the jth simulated device. There are altogether S such sparse matrix, and for each matrix $M_j$ the chosen dimensionality is M×N (N>M>1). Given that each such matrix has N non-zero elements for each sensor location, the sparsity of each such matrix would be (1−1/M).

In step six 212 of the method, a linear transform operator is applied on each element of the [Set($M_j$)] (j=1 . . . S) such that a composite sparse matrix, R, is generated of dimension S×(M×N). This composite sparse matrix, R, thus describes the attenuation of signal across the entire environment. Thus, step six 212 of the method generates a model of signal strength distribution associated with a wireless transmitter position and or movement. In some embodiments, this data is fed to a K-NN (k-nearest neighbor) algorithm to generate a model of signal strength distribution association with the sensor distribution. This model is then used to compute the nearest sensor coordinates when signal from a hitherto unknown device is detected in later steps of the method.

In step seven 214 of the method, each sensor 102 measures a signal strength from an intrusive device. The measured signal strength at each sensor 102 is combined to form a measured signal strength vector representing the measurements at each of the sensors in the region of interest. In some embodiments the signal strength is measured as a function of time so this information can be used to track movement information about the intrusive device.

In step eight 216, the method then accurately determines the Cartesian coordinates of an intrusive device 106 based on measured signal strength of the intrusive device's 106 wireless emission as detected by the sensors positioned along each point in $C_i$ (i=1 . . . N). In some embodiments, the process that determines the Cartesian coordinates of the intrusive device 106 runs in the server 108. In some embodiments Cartesian coordinates are determined as a function of time to track movement information about the intrusive device.

In some embodiments, the presence of an intrusive device 106 is detected by appearance of a signal-emitting wireless source of unknown fingerprint (i.e., an unique signature in the signal) in the environment. Once the intrusive device 106 is detected, its detected signal strength vector across all of $C_i$ is fed to a regression algorithm that can predict its precise Cartesian coordinates in F. Thus, one feature of the present teaching is that higher-dimension sparse matrices are determined using the electromagnetic wave propagation equation before these matrices are fed as training set to a k-NN regression algorithm.

In some embodiments, a k-NN regression algorithm is used for this task. One advantage of k-NN in this context is that k-NN is an unsupervised learning algorithm where the training set itself—composite sparse matrix, R—is the exemplar and uses fast instance-based learning. The complexity in storing a training set as well as classifying a single instance (i.e., predicting the accurate location of a newly detected device) are both O(n), where n=S*M*N.

Another advantage of k-NN is that k-NN is non-parametric. That is, k-NN makes no assumption about the probability distribution of the devices in the environment. Each simulation point Si can be the center of equi-sized cells of Voronoi tessellation to classify the location of a new device. The value of k (1<k<S) can be tuned to optimize the accuracy of the regression.

In some embodiments, a subset, $S_s$ of the sensors 102 also transmit actual wireless signals and a measured recorded signal strength at a set of receiving sensors 102 across the $C_i$'s is generated from the measured data. This constitutes measured data set, D. The real observed data set, D, can be used in combination with the sparse matrix, R, to yield predictions from semi-supervised regression algorithms. The real observed data set, D, can also be used to compare the different distributions out of k-NN for different values of k using the Likelihood-ratio test according to the Neyman-Pearson lemma.

The algorithm predicts the Cartesian coordinate of the nearest simulation point, $S_i$, in the grid with the radius, r, of the cell in the tessellation. As such, a precise and targeted isolation of that device is possible. The time taken from the intrusion device 106 identification to the determination of the Cartesian coordinate that is an estimate of its location is very fast. As such, identification-to-isolation of an intruding device 106 is possible in near real-time, thus minimizing the time any threat vector that results from the intruding device 106 is exposed. While a k-nearest neighbor regression algorithm is described, a variety of known regression algorithms may be used to predict the Cartesian coordinates of the intrusive device using the signal strength vector and the composite sparse matrix of the present teaching.

In some embodiments of step eight 216 of the method, the set of simulation matrices, $M_i$, from each sensor location is raveled and stacked row-wise. The ravel process converts data into a vector. A ravel process applied to a matrix or higher dimensional array produces a vector made from the elements in the array. Thus, the raveled and stacked set of sparse matrices produces a composite map that describes signal attenuation across the environment that contains the devices of interest. Using the k-nearest neighbors model, this composite map is then used to fit an unsupervised estimator. At this point, the unsupervised regression algorithm can be queried using actual measured signal strength values received by the sensors, e.g. the measured signal strength vectors, to return a prediction about the intrusive device true position.

Various transform operators can be used to generate the composite map from the sparse matrices. In some embodiments, for operator, T, composite map, C, and set, S, of sparse matrices, $M_i$, transform T: S→C is the sequential horizontal (column wise) stacking of each element of the set S of flattened sparse matrices, such that an element $M_i$ of S is an m×n sparse matrix whose 1-dimensional contiguous flattened subarray is of shape (1, m*n). The resultant composite matrix, C is thus aj×m*n sparse matrix where j is the number of elements of S. Thus, in this embodiment, transform, T, is simply a linear raveling operator. In some embodiments, transform, T, may be improved through a back-propagation or pre-processing step.

One feature of the present teaching is the accuracy of the position prediction. Random sampling of measured signal strength at the sensors 102 of actual wireless signals emanating from sensors 102 or other known wireless transmitters in the region of interest can be used to determine the accuracy of the unsupervised estimate. In some embodiments, however, the simulation layer is used to avoid the collection of such data. However, in embodiments in which measured signal strength data from wireless signals of transmitters whose location is known is collected, it can be used to train the unsupervised regression algorithm, as well as test the accuracy of the location prediction it provides.

One method of generating measured data is to use the wireless devices. In these embodiments, one device acts as a radio transmitter, the other devices record signal strength measurements. This process is repeated such that each device acts as a radio transmitter, and multiple signal strength measurements are generated at each device. This set of real data points has flattened subarrays that are the same shape as the simulated data. This set of flattened subarrays are then be used to fit the unsupervised regressor to compare against the simulated nearest neighbors.

The transform, T, of the present teaching can remove the "sparsity" of each element of the set, S, such that the resultant composite matrix, C, is dense and the unsupervised regression algorithm is being fit with dimensionless input. Here dimensionality reduction happens before the unsupervised k-nearest neighbor regression algorithm is called, and data space reconstruction is performed by implicit simulation and optimized through sparseness.

One feature of the present teaching is that it can track the movement of the intrusive device. The measured signal strength at the sensors of the wireless transmissions from the intrusive device can be reported in near-real time. Furthermore, given that the regression algorithm of the present teaching accurately identifies the spatial coordinates of an intrusive device in near real-time, it can also track the motion of the intrusive device if and as it moves through the region of interest.

Figure 3:
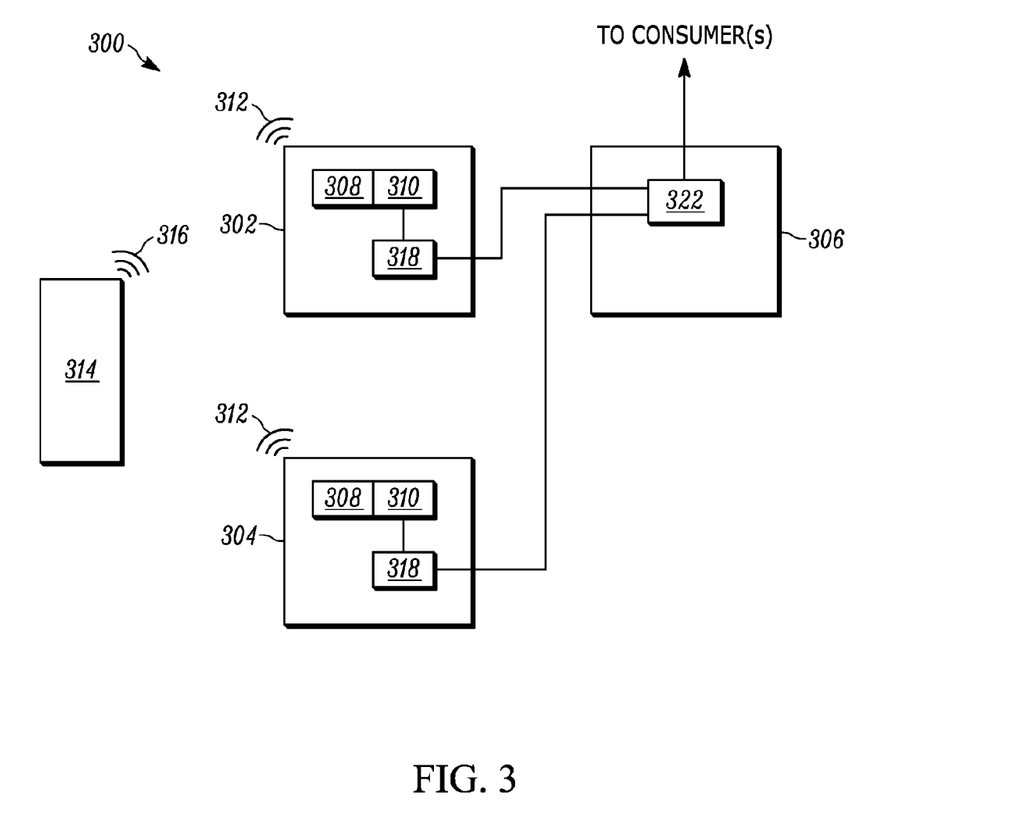
FIG. 3 illustrates an embodiment of a location determination services system of the present teaching comprising direction recognition modules and a location service module.

FIG. 3 illustrates an embodiment of a wireless device location determination system 300 of the present teaching comprising sensor measurement modules 302, 304 and a location determination module 306 of the present teaching. Two sensor measurement modules 302, 304 are shown in FIG. 3, but the number of sensor measurement modules 302, 304 can be any number. The location determination module 306 is shown as a separate element in FIG. 3, but in various embodiments the elements of the location determination module 306 may be collocated with one or more sensor measurement modules 302, 304 in the same wireless device. The location determination module 306 may also be located remotely from the sensor measurement modules 302, 304. The functions of the location determination module 306 may also be implemented in a distributed processor architecture as well understood by those skilled in the art. In general, the location determination module 306 comprises a network interface that provides connections for communications to the sensors and to users and other applications, a memory that holds an instruction set that implements at least some of the steps of method of the present teaching, and a processor that executes the instruction set.

The sensor measurement modules 302, 304 include a wireless transmitter 308 and a wireless receiver 310. In some embodiments, the wireless transmitter 308 in each sensor measurement modules 302, 304 provides a wireless signal 312 with a predetermined and unique fingerprint that allows the wireless signal emitted by that device to be distinguished at wireless receiver in a different device. The wireless receiver 310 in each sensor measurement modules 302, 304 receives distinguishable wireless signals from a plurality of wireless devices. The wireless signals from each wireless device may each comprise a unique fingerprint for rapid identification of the emitting device and its last known position. The wireless signals may include cellular signals, LTE signals, WiFi signals, Bluetooth or any of a large variety of wireless signals. In various embodiments, the wireless devices may include direction recognition modules, or the wireless devices may be wireless transmitting devices 314 with known positions that transmit a wireless signal 316 that can be identified by the wireless receiver 310 in the sensor measurement modules 302, 304. For example, the wireless transmitting device 314 may be a cell tower, a WiFi hot spot, or WiFi router that may not include a direction recognition module. Any number of wireless transmission devices 314 may be part of the location service system 300.

The sensor measurement modules 302, 304 also include a power monitor 318 that measures a wireless signal strength of each identified wireless signal as a function of time. In this way, the power monitor 318 determines a wireless signal strength for each of the plurality of wireless devices in the region of interest.

The power monitors 318 of the sensor measurement modules 302, 304 are connected to a processor 322. In various embodiments, the connections from the power monitors 318 to the processor 322 may be wireless communication links, or they may be wired communication links. In some embodiments the processor 322 is co-located in one or more sensor measurement modules 302, 304. In the embodiment of FIG. 3, the processor 322 is located in a separate location determination module 306. The processor 322 establishes a frame of reference and simulation grid after determining location coordinates and/or movement vectors for each sensor based on information received from the sensor measurement modules 302, 304. The processor 322 generates a sparse matrix representing a simulated signal strength at each sensor location for each point on the simulation grid.

The sensor measurement modules 302, 304 measure signal strength of wireless signals emanating from one or more intrusive devices using the power monitor 318. In some embodiments, the signal strength is measured as a function of time. The sensor measurement modules 302, 304 send the data from the power monitor 318 about the signal strengths measured from intrusive devices to the processor 322 so the processor 322 can use this data to determine precise location and movement information about the intrusive devices. Movement information about the intrusive device is derived from the signal strength measured as a function of time.

In some embodiments, the location determination module 306 functions are implemented as a software as a service (SaaS) stack running in the cloud, and the sensor measurement modules 302, 304 send the data from the power monitor 318 about signal strengths measured from wireless transmission from intrusive devices over the Internet using wireless and/or wired connections.

Figure 4:
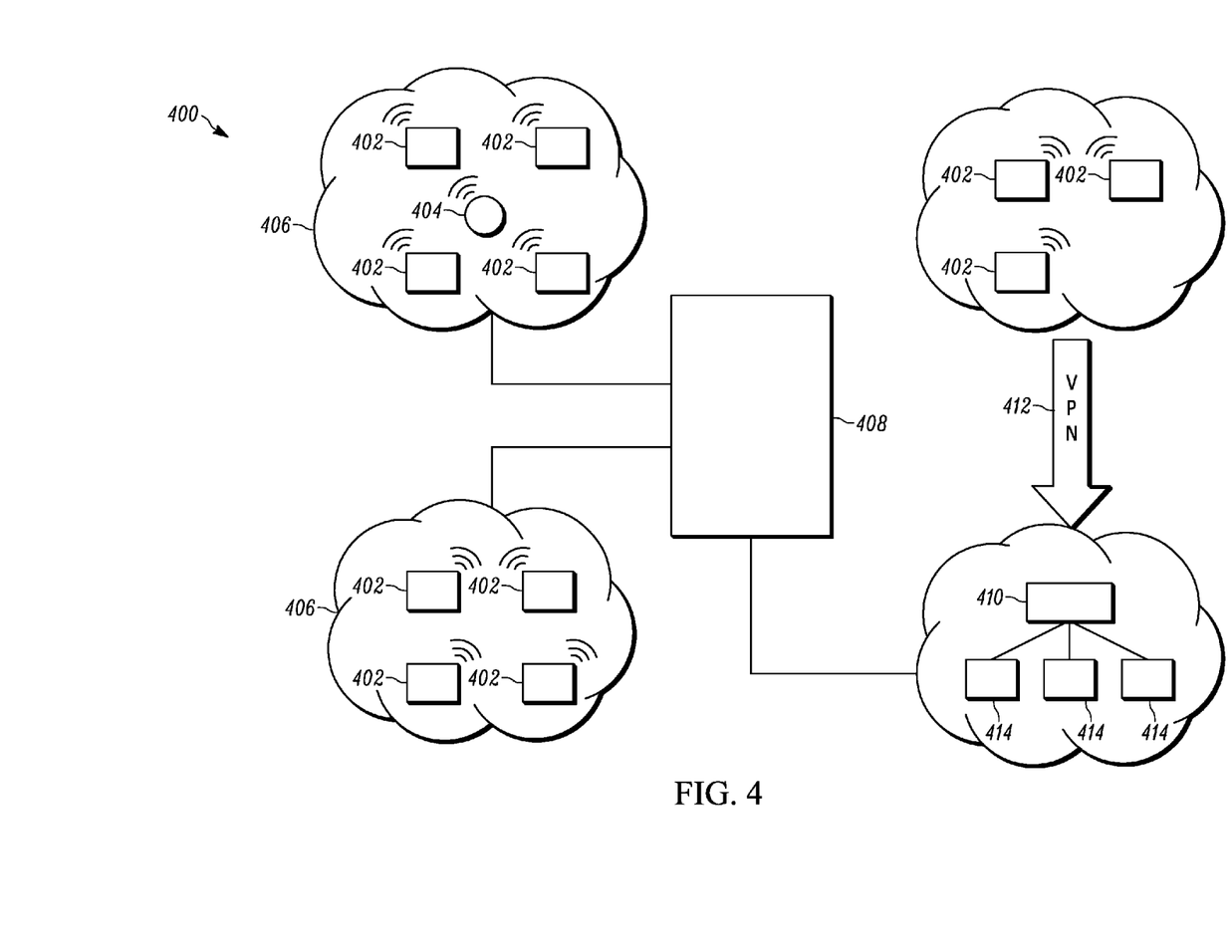
FIG. 4 illustrates a wireless and internet network instantiation of an embodiment of an apparatus and method for providing wireless device location determination services of the present teaching.

FIG. 4 illustrates an embodiment of a wireless device location determination system 400 comprising a hybrid network of sensors 402 and intrusive devices 404 of the present teaching. In this embodiment, the sensors 402 reside in one or more local networks 406 that are connected via the Internet 408. A server 410 implements the wireless device location determination method of the present teaching using simulation matrices provided by the sensors 402 to generate location and/or movement information about the intrusive device 404. Some of the local networks 406 may be connected via virtual private network connection 412. The location and/or movement information about the intrusive device 404 is used by any of a number of processes 414 that provide services and applications based on the location and/or movement information. Multiple intrusive devices 404 may be analyzed simultaneously, whether those intrusive devices 404 are in a common local network 406 or different local networks 406. The server 410 is located remotely from the sensors 402, and may be located at a private enterprise, or in a web-hosting site. The web-hosting site may be a public or private web hosting site While the network configuration shown in FIG. 4 illustrates that the server 410 is a single box, the server 410 can be implemented in a variety of known configurations. For example, the processors that provide the wireless device location determination function may be multiple processors in either centralized or distributed locations. The wireless device location determination function may be a software application running on a dedicated processor. The wireless device location determination function may be a service built using any of a known set of frameworks for constructing services or web application in the cloud.

Figure 5:
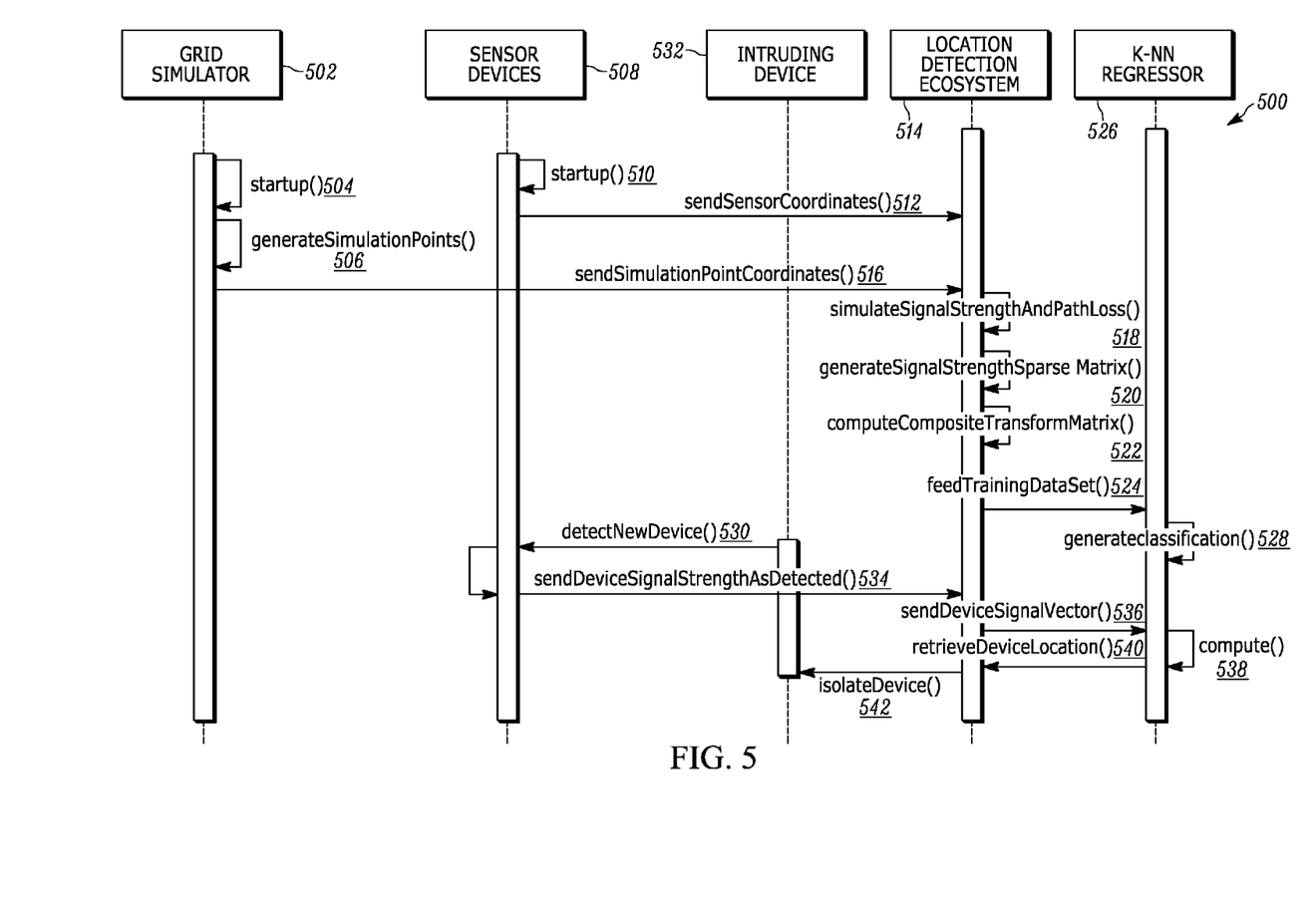
FIG. 5 illustrates a sequence diagram of an embodiment of an apparatus and method for providing wireless device location determination services of the present teaching.

FIG. 5 illustrates a sequence diagram 500 of an embodiment of an apparatus and method for wireless device location determination services of the present teaching. A grid simulator process 502 initiates a startup 504 and generates 506 simulation points for a region of interest. A sensor process 508 initiates a startup 510 and sends 512 location coordinates to a location determination process 514. FIG. 5 shows only one sensor process 508 for clarity, but multiple sensors may be used. The grid simulator process 502 sends 516 the simulation points to the location determination process 514. The location determination process 514 simulates 518 signal strength and path loss for a virtual wireless transmitter at each simulation point in the region of interest. The location determination process 514 generates 520 a signal strength sparse matrix for each of the sensor processes 508 in the region of interest. The location determination process 514 computes 522 a composite transform matrix based on the generated 520 signal strength sparse matrices. The location determination process 514 feeds 524 the composite transform matrix to a k-nearest neighbor regression algorithm process 526 that generates 528 a classification. The classification is a deterministic model in which, based on signal strengths as detected by the sensor process 508, a prompt identification of the nearest devices, either a sensor or another transmitting device, can be made. This classification produces the coordinates for each of the sensor devices, which are recorded in the system. The sensor process 508 detects 530 a wireless signal generated by an intrusion device process 532. The sensor process 508 determines and sends 534 the detected signal strength to the location determination process 514. The location determination process 514 receives multiple measured signal strengths from multiple sensors, if available, and generates a signal strength vector from all the received measured signal strengths. The location determination process 514 sends the signal strength vector to the regression algorithm process 526. The regression algorithm process 526 computes 538 the location and/or movement information of the intrusion device running the intrusion device process 532. The location and/or movement information is retrieved 540 from the k-nearest neighbor regression algorithm process 526 by the location determination process 514 and action is taken to isolate 542 the intrusion device.

Figure 6:
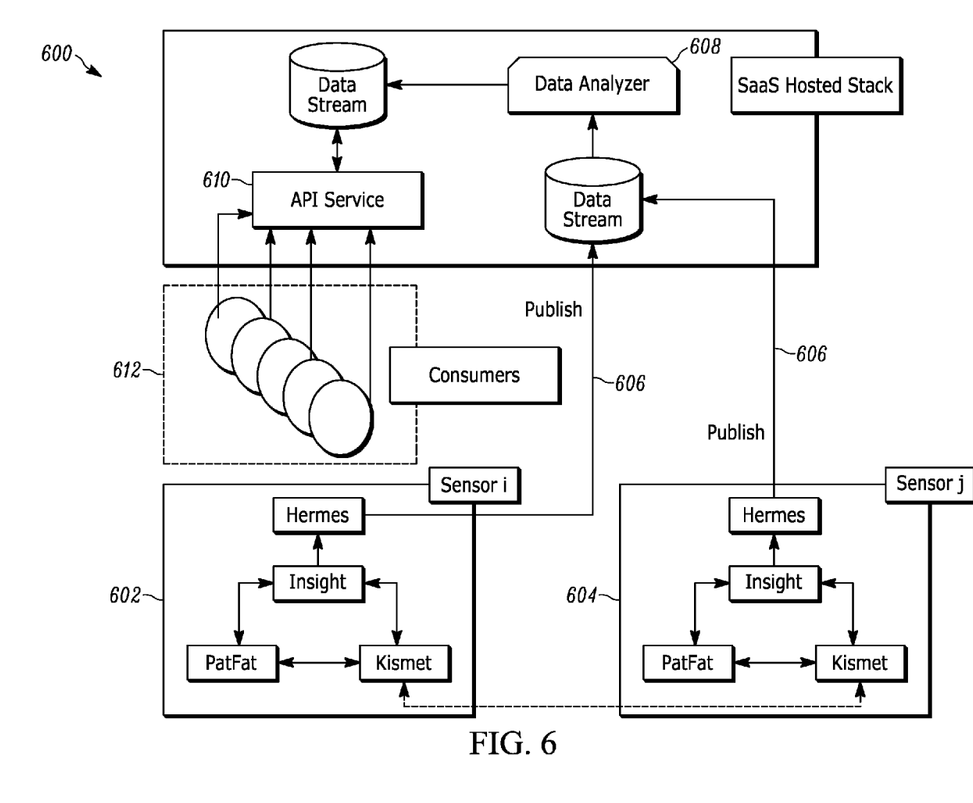
FIG. 6 illustrates an ecosystem of services of an embodiment of an apparatus and method for providing wireless device location determination services of the present teaching.

FIG. 6 illustrates an ecosystem of services 600 of an embodiment of an apparatus and method for providing wireless device location determination services of the present teaching. FIG. 6 illustrates how, in some embodiments, various application modules connect to perform various functions or services using location data generated by the wireless device location determination service. FIG. 6 illustrates only two sensor processes 602, 604 for clarity, however, more sensor processes may be participating in the wireless device location determination method of the present teaching. The sensor processes 602, 604 publish 606 initial coordinates and also matrices representing measured wireless signal strength of wireless emission from an intrusion device as a function of time. The published data is analyzed by a process 608 that determines the location and/or movement of one or more intrusion devices. The location and movement data for the intrusion device(s) is used by an API process 610 to support a variety of services 612.

One service embodiment detects and tracks one or more intrusion devices. Another service embodiment remediates a security violation of one or more intrusion devices. Another service embodiment detects threats from one or more intrusion devices, locates those devices, assesses and prioritizes the risk from that threat, and provides and action report relating to the threat. Another service embodiment provides tracking of information security compliance regulations as part of a risk assessment that relies on the location and/or movement of the one or more intrusion devices. The APIs that may be supported by the wireless device location determination method of the present teaching are not limited to the examples listed above. Any of a variety of known location-based services can be supported. For example, the application of methods and apparatus of the present teaching may apply to applications as diverse as geolocation services, location-aware services, health and compliance services and augmented reality.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of wireless device location determination, the method comprising:
    a) defining a region of interest comprising a plurality of sensors;
    b) establishing a reference frame and a grid comprising a plurality of simulation points with locations based on a coordinate system associated with the region of interest;
    c) establishing location coordinates for each of the plurality of sensors based on the coordinate system;
    d) determining a plurality of simulated wireless signal strengths from the plurality of simulation points at the location coordinates for each of the plurality of sensors;
    e) generating a simulated signal strength matrix for each of the plurality of sensors using a respective one of the plurality of simulated wireless signal strengths for respective ones of the plurality of simulation points;
    f) generating a composite matrix comprising a sparse matrix based on the plurality of simulated signal strength matrices;
    g) measuring wireless signal strength at each of the plurality of sensors based on a wireless emission from an intrusive device;
    h) generating a measured wireless signal strength vector based on the measured wireless signal strength at each of the plurality of sensors; and
    i) determining a location of the intrusive device based on the measured wireless signal strength vector and the composite matrix; and
    j) isolating the located intrusive device based on a predetermined threat vector.

2. The method of wireless device location determination of claim 1 wherein the reference frame comprises a static reference frame.

3. The method of wireless device location determination of claim 1 wherein the reference frame comprises an inertial reference frame.

4. The method of wireless device location determination of claim 1 wherein the region of interest is one-dimensional.

5. The method of wireless device location determination of claim 1 wherein the region of interest is two-dimensional.

6. The method of wireless device location determination of claim 1 wherein the region of interest is three-dimensional.

7. The method of wireless device location determination of claim 1 wherein determining the plurality of simulated wireless signal strengths from the plurality of simulation points at the location coordinates for each of the plurality of sensors comprises determining the respective plurality of simulated wireless signal strengths using a Log-distance path loss model.

8. The method of wireless device location determination of claim 1 wherein determining the plurality of simulated wireless signal strengths from the plurality of simulation points at the location coordinates for each of the plurality of sensors comprises determining the respective plurality of simulated wireless signal strengths using a free-space path loss formula.

9. The method of wireless device location determination of claim 1 wherein the determining the location of the intrusive device based on the measured wireless signal strength vector and the composite matrix comprises determining the location using a learning algorithm.

10. The method of wireless device location determination of claim 9 wherein the learning algorithm comprises a k-nearest neighbor learning algorithm.

11. The method of wireless device location determination of claim 1 further comprising updating the composite matrix using measured wireless signal strengths at one or more of the plurality of sensors.

12. The method of wireless device location determination of claim 1 further comprising determining a motion of the intrusive device based on the signal strength vector and the composite matrix.

13. A wireless device location determination system comprising:

a) a network interface configured to receive data from a plurality of sensors;
b) a memory configured to store computer-executable instructions; and
c) a processor configured to access the memory and execute the computer-executable instructions comprising:
   i) defining a region of interest comprising the plurality of sensors;
   ii) establishing a reference frame and a grid comprising a plurality of simulation points with locations based on a coordinate system associated with the region of interest;
   iii) establishing location coordinates for the plurality of sensors based on the coordinate system;
   iv) determining a plurality of simulated wireless signal strengths from the plurality of simulation points at the location coordinates for each of the plurality of sensors;
   v) generating a simulated signal strength matrix for each of the plurality of sensors using a respective one of the plurality of simulated wireless signal strengths for respective ones of the plurality of simulation points;
   vi) generating a composite matrix comprising a sparse matrix based on the plurality of simulated signal strength matrices;
   vii) measuring wireless signal strength at each of the plurality of sensors based on a wireless emission from an intrusive device;
   viii) generating a measured wireless signal strength vector based on the measured wireless signal strength at each of the plurality of sensors;
   ix) determining a location of the intrusive device based on the measured wireless signal strength vector and the composite matrix; and
   x) isolating the located intrusive device based on a predetermined threat vector.

14. The wireless device location determination system of claim 13 wherein the reference frame comprises a static reference frame.

15. The wireless device location determination system of claim 13 wherein the reference frame comprises an inertial reference frame.

16. The wireless device location determination system of claim 13 wherein the region of interest is one-dimensional.

17. The wireless device location determination system of claim 13 wherein the region of interest is two-dimensional.

18. The wireless device location determination system of claim 13 wherein the region of interest is three-dimensional.

19. The wireless device location determination system of claim 13 wherein the processor further executes instructions that determine the respective plurality of simulated wireless signal strengths using a Log-distance path loss model.

20. The wireless device location determination system of claim 13 wherein the processor further executes instructions that determine the respective plurality of simulated wireless signal strengths using a free-space path loss formula.

21. The wireless device location determination system of claim 13 wherein the processor further executes instructions for a learning algorithm that determines the location of the intrusive device based on the measured wireless signal strength vector and on the composite matrix.

22. The wireless device location determination system of claim 21 wherein the learning algorithm comprises a k-nearest neighbor learning algorithm.

23. The wireless device location determination system of claim 13 wherein the processor further executes instructions to determine a movement of the intrusive device.

* * * * *